United States Patent [19]

Hetherington et al.

[11] Patent Number: 4,995,041
[45] Date of Patent: Feb. 19, 1991

[54] WRITE BACK BUFFER WITH ERROR CORRECTING CAPABILITIES

[75] Inventors: Ricky C. Hetherington; Tryggve Fossum, both of Northboro; Maurice B. Steinman, Grafton; David A. Webb, Jr., Berlin, all of Mass.

[73] Assignee: Digital Equipment Corporation, Maynard, Mass.

[21] Appl. No.: 306,703

[22] Filed: Feb. 3, 1989

[51] Int. Cl.$^5$ ............................................. G06F 11/10
[52] U.S. Cl. .................................... 371/40.1; 364/200
[58] Field of Search ........................... 371/40.1, 40.2; 364/200 MS File, 900 MS File

[56] References Cited

U.S. PATENT DOCUMENTS

| 3,949,379 | 4/1976 | Ball | 364/200 |
| 4,392,200 | 7/1983 | Arulpragasam | 364/200 |
| 4,493,081 | 1/1985 | Schmidt | 371/37.3 |
| 4,500,958 | 2/1985 | Manton et al. | 364/200 |
| 4,506,362 | 3/1985 | Morley | 371/40.1 |
| 4,780,809 | 10/1988 | Woffinden et al. | 364/200 |

OTHER PUBLICATIONS

W. F. Bruckert & R. E. Josephson, "Designing Reliability into the VAX 8600 System," *Digital Technical Journal*, No. 1, Aug. 1985, pp. 71–75.
*KA86 MBox Technical Description*, Digital Equipment Corporation, Pub. No. EK-KA86M-TD-00341,5 (1985).
Fossum et al., "An Overview of the VAX 8600 System," Digital Technical Journal, No. 1, Aug. 1985, pp. 8–23.
Troiani et al., "The VAX 8600 I Box, A Pipelined Implementation of the VAX Architecture," Digital Technical Journal, No. 1, Aug. 1985, pp. 24–42.
Levy and Eckhouse, Jr., *Computer Programming and Architecture, The VAX-*11, Digital Equipment Corporation, 1980, pp. 263–276, 296–303, 351–368.
G. Desrochers, *Principles of Parallel and Multiprocessing*, Intertext Publications, Inc., McGraw-Hill Book Co., 1987, pp. 68–71.

*Primary Examiner*—Charles E. Atkinson
*Attorney, Agent, or Firm*—Arnold, White & Durkee

[57] ABSTRACT

In the operation of high-speed computers, it is frequently advantageous to employ a high speed cache memory within each CPU of a multiple CPU computer system. A standard, slower memory configuration remains in use for the large, common main memory, but those portions of main memory which are expected to be used heavily are copied into the cache memory. Thus, on many memory references, the faster cache memory is exploited, while only infrequent references to the slower main memory are necessary. This configuration generally speeds the overall operation of the computer system; however, memory integrity problems arise by maintaining two separate copies of selected portions of main memory. Accordingly, the memory access unit of the CPU uses error correction code (ECC) hardware to ensure the integrity of the data delivered between the cache and main memory. The prevent the ECC hardware from slowing the overall operation of the CPU, the error correction is performed underneath a write back operation. Data contained in the cache, which will be displaced by data received from main memory 10, is transferred to a write back buffer (WBB) during that period of time between the request for data from the main memory and actual delivery of the requested data. Further, the ECC hardware also operates on the cache data being written to the WBB. Accordingly, a performance penalty is avoided by performing error correction and preremoving the cache data during that idle period of time.

17 Claims, 7 Drawing Sheets

WRITE BACK BUFFER WITH ERROR CORRECTING CAPABILITIES

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OR REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION REPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 70/306,846 filed Feb. 3, 1898; D. Fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. Ser. No. 07/306,343 filed Feb. 3, 1989; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,828 filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989; Webb, Jr. et al., PROCESSING OF MEMORY ACCESS EXCEPTIONS WITH PREFETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989; and Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989.

FIELD OF THE INVENTION

This apparatus relates generally to a system for detecting and correcting data bit errors in a central processing unit (CPU) and, more particularly, to error correction of cache memory during write back operations to main memory.

DESCRIPTION OF THE RELATED ART

In the field of high speed computing, processor speed is generally limited by memory performance. For example, the CPU executes instructions at a predetermined rate. Similarly, main memory performs read and write operations at a second predetermined rate which is typically less than one order of magnitude slower than the CPU execution rate. In other words, the access time of main memory is insufficient to keep up with the CPU. Thus, during the execution of memory access instructions, CPU performance will degrade to the memory access rate. The CPU must wait for memory to complete its cycle on every instruction execution.

It is possible to construct a special-purpose memory which has a cycle time approximately equal to that of the CPU's instruction cycle time. Unfortunately, such memories are far more expensive than typical semiconductor memories and are generally not feasible as a total primary memory solution. Accordingly, many computer systems compromise by constructing a relatively small cache of this high speed memory while retaining the slower semiconductor memory as the primary memory.

The cache is managed under hardware control to maintain a copy of a portion of the main memory which is likely to be used by the CPU. Thus, as long as the CPU only accesses those memory locations maintained in the cache, the CPU will execute at full speed. Of course, it is inevitable that the CPU will occasionally attempt to read a memory location not contained in the cache. During these misses, the data are retrieved from main memory and stored in the cache. Therefore, CPU performance degrades to the main memory access rate during misses, but the overall speed of the processor is enhanced by the use of the high speed cache.

Use of the cache memory is not free from complications. Data consistency problems can arise by using a cache to store data that also appear in the primary memory. For example, data which are modified by the CPU and stored in the cache is necessarily different from the data stored at that same memory location in the primary memory. This is particularly problematic in multiple processor systems. Each of these processors may need access to the same data. Thus, a read operation of the data stored in main memory will not retrieve the most recent version of that data stored in the cache of another processor. Generally, there are two methods of ensuring data consistency: the write-through method and the dirty-bit method.

The write-through method is a brute force solution to the problem of data consistency. A CPU write to cache memory is immediately propagated to the main memory, thereby eliminating data consistency by eliminating any differences between cache and main memory. The obvious repercussions of such a solution are reflected in reduced processor speed. In the case of multiple write operations, the cache cycle time would essentially become that of the main memory since a previous write must be allowed to complete before a new write can be issued. Further, the delays are especially disturbing, in that, many are completely unnecessary. For example, much of the data written are of a temporary nature and will never be needed by any of the other processors. Thus, the time devoted to these unnecessary write operations is wasted.

The dirty-bit method is a more desirable solution to the problem of data consistency from the standpoint of speed of operation. Each cache entry has an additional bit that is asserted when the CPU writes data to that location. The data are not written through to main memory. Rather, the asserted bit indicates that the particular cache entry is now the only copy of that data and it differs from the data in that same location in main memory. To prevent unnecessary writes to main memory, that cache entry will only be written back to main memory under two alternative conditions. First, if another CPU requests the data, then the data must be written to main memory. Second, the CPU may eventually request data not in the cache. Of course, these data are retrieved from main memory and stored in the cache. However, the cache location used to store the retrieved data may have its dirty-bit asserted. Thus, to prevent losing the data stored in the cache, these data are written back to main memory.

The risk inherent with the dirty-bit method is the possibility of losing data. Since the cache contains the only copy of the written data, loss of these data can result in a general failure of the process currently being executed by the CPU. However, while it is possible to introduce an error correcting system between the cache and main memory, its use results in further delays to main memory write operations. Thus, the time saved by eliminating unnecessary write operations may be lost by ensuring that cache data are preserved.

Further, while the dirty-bit method reduces the number of write operations to only those which are absolutely necessary, the processor is still slowed by these remaining write operations. It is desirable that the CPU be configured to reduce the number of main memory write operations to only those absolutely necessary, to hide those remaining write operations underneath other necessary CPU processes, and to preserve the integrity of cache data without adversely affecting the speed of main memory write operations.

SUMMARY OF THE INVENTION

To provide error correction of cache memory being written back to main memory without adversely affecting processing speed, a digital computer system is provided with an apparatus for controlling write back operations between a cache memory located in a central processing unit and a main memory. The apparatus includes means for detecting the absence of desired data in the cache and delivering a refill request signal to the main memory. The main memory includes means for processing the refill request signal during a preselected duration of time and delivering the desired data to the cache. Means determines a cache location for storing the desired data and delivering preexisting data from the desired cache location to a write back buffer during the preselected duration of time. Means receives the desired data from the main memory and stores the desired data in the desired cache location. Means delivers the preexisting data from the write back buffer to the main memory in response to delivery of the desired data to the cache being completed.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
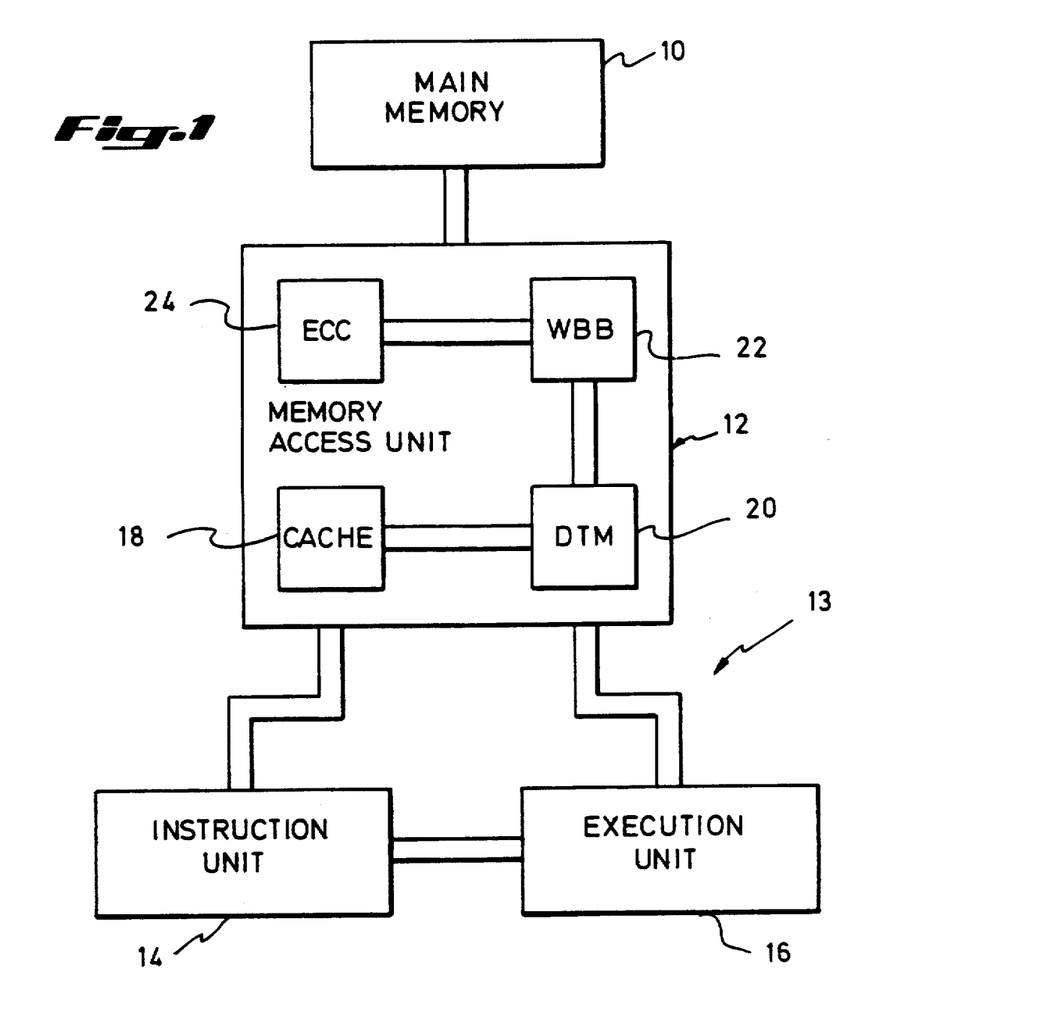
FIG. 1 is a block diagram of a data processing system including a central processing unit linked to a main memory by a memory access unit.

Turning now to the drawings, FIG. 1 illustrates a top level diagram of a portion of a digital computer system which includes a main memory 10, a memory access unit 12, and at least one central processing unit (CPU) 13 including an instruction unit 14, and an execution unit 16. It should be understood that additional CPUs could be used in such a system by sharing the main memory 10. It is practical, for example, for up to four CPUs to operate simultaneously and communicate efficiently through the shared main memory 10.

Inside the CPU 13, the execution of an individual instruction is separated into multiple smaller tasks. These tasks are performed by dedicated, separate, independent functional units that are optimized for that purpose. Although each instruction ultimately performs a different operation, many of the smaller tasks into which each instruction is separated are common to all instructions. Generally, for example, the instruction unit 14 performs the following steps: instruction fetch, instruction decode, and operand fetch. Thereafter, the decoded instruction is transferred to the execution unit 16 where the instruction is executed and its results stored in memory.

Accordingly, both the instruction and execution units 14, 16 must access the memory. The instruction unit 14 retrieves instructions stored in memory and also delivers addresses for read and write operations performed by the execution unit 16. Likewise, the execution unit 16 also delivers read and write addresses to memory, as well as, the actual data to be written.

The memory access unit 12 provides an interface between the CPU 13 and main memory 10. However, not all memory references generated by the CPU 13 are communicated to the main memory 10. Rather, the memory access unit 12 includes a high-speed cache 18 which contains copies of selected portions of the main memory 10. The main memory 10 is constructed of standard semiconductor memory components and has a cycle time substantially greater than the cycle time of the CPU 13. Accordingly, main memory references by the CPU 13 will result in slowing the cycle time of the CPU 13 to that of the main memory 10. Therefore, to reduce the number of main memory references and enhance processor speed, the cache 18 is provided.

The cache 18 is constructed of high-speed memory components which have a cycle time approximately equal to the cycle time of the CPU 13. Thus, memory references to the cache 18 will not slow the operation of the CPU 13. For example, a read instruction executed by the CPU 13 must wait for the data to be returned from memory. As long as the cycle time of memory is no greater than the cycle time of the CPU 13, then the data are returned to the CPU 13 before the next instruction is executed. The CPU 13 does not have to stall, waiting for the data. Unfortunately, the components used to construct the cache 18 are of a relatively high cost such that only the most expensive and fast computers can afford to use them as main memory.

Alternatively, most high end computers, and the computer described herein, employ the standard semiconductor technology for main memory, but also employ a relatively small cache of high speed memory. The cache 18 maintains the data most likely to be needed by the CPU 13. Thus, many memory references will hit on the data stored in the cache 18, and the CPU 13 will continue to execute at its maximum rate. Occasionally, the cache 18 will not contain the desired data and the memory access unit 12 will retrieve the desired data from main memory 10 and store it in the cache 18. Similarly, since the computer system is capable of supporting up to four CpUs, there will occasionally be a request by one CPU for data which has been changed by another CPU. In other words, the most recent version of data desired by one CPU is contained in the cache 18 of another CPU. Therefore, the memory access unit 12 must not only be capable of retrieving data from main memory 10, but also be able to write data back to the main memory 10. To control this flow of data to and from main memory 10, the memory access unit 12 includes a data traffic manager (DTM) 20.

Additionally, it should be noted that the need to write data back to the main memory 10 is frequently caused by a CPU request for data, when that data are not already present in the cache 18. For example, the cache 18 is of a standard two-way set associative construction, similar to that described in Levy & Eckhouse, *Computer Programming and Architecture: The VAX*-11, April 1980, pp 357-58. Thus, for any main memory location there are two cache locations in which that data may be stored. However, these two locations are also shared by a large number of other main memory locations. Therefore, when data are retrieved from main memory 10 its storage in the cache 18 will displace data previously stored at that cache location. If this displaced data has been altered by the CPU 13, then it must be written to the main memory 10 or it is lost. To facilitate this write back of displaced data, the memory access unit 12 includes a write back buffer (WBB) 22 connected with the DTM 20 to hold the data until the memory access unit 12 completes the retrieval of the desired main memory data. Thereafter, the data are transferred from the WBB 22 to main memory 10.

The data maintained in the cache 18 and WBB 22 is protected from single and double bit errors by error correction codes (ECC) stored in an error correction code RAMs 24. The coding scheme, for example, is a modified Hamming code. While error correction code check bit patterns are generated for all data retrieved from main memory, only the data being written back to main memory are compared against the Hamming code and corrected. This is an effective means of error correction because the cache data that have not been written by the CPU 13 are an exact copy of corresponding data stored in the main memory 10, while the written data are contained only in cache 18. Therefore, the ECC RAMs 24 are disposed in close proximity to WBB 22.

Further, it is important to note that the error correction process is performed on the data contained in WBB 22 during that time period between a CPU request for main memory data and the actual delivery of the desired data to the cache 18. Thus, the error correction process does not adversely affect CPU operating speed since it takes advantage of unused time spent waiting for main memory. Therefore, the written cache data are protected while maintaining the high speed and performance of the cache 18.

Figure 2:
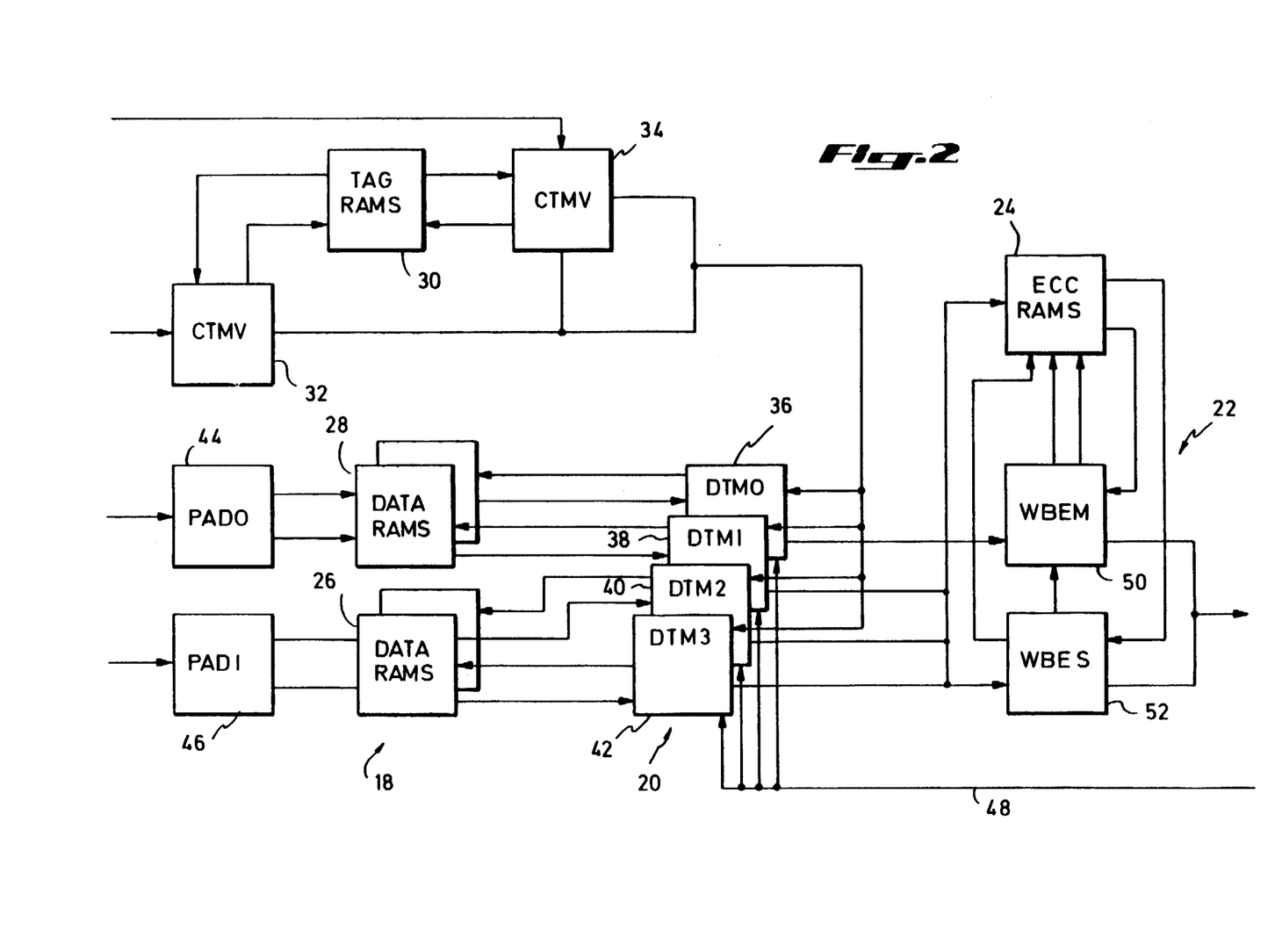
FIG. 2 is a block diagram of the memory access unit of FIG. 1, showing a write back buffer split into two portions.

Referring now to FIG. 2, a detailed block diagram of a portion of the memory access unit 12 is shown. As discussed previously, the cache 18 is two-way set associative and necessarily includes two sets of data RAMs 26, 28. Each set of RAMs 26, 28 includes forty 4k × 4 SRAMs interconnected to provide a cache having 8k lines, 72 bits wide. Each line contains 64 data bits and 8 parity bits (1 for each data byte). The data are grouped in 64 byte blocks, quadword aligned. In other words, the block begins at a byte address which is a multiple of 64, which means that the least significant 16 bits of the binary address are zero.

In order to identify which blocks of data are present in the data RAMs 26, 28, a set of tag RAMs 30 is maintained by the cache 18. The tag RAMs 30 contain the beginning block address of each of the blocks currently present in the data RAMs 26, 28. It can be seen that since each set of the data RAMs includes 8k lines and each block fills 8 lines, 1k memory locations are needed to keep track of the data stored in each set of data RAMs 26, 28. Accordingly, the tag RAMs 30 include eighteen 1k×4 RAMs. These RAMs are configured to provide two sets of 1k lines, 36 bits wide. Stored within the 36 bits is the starting physical address of the block (bits 32:16 of the physical address), a valid bit for each longword in the block (16 bits), a written bit indicating whether the block has been altered by the CPU 13, and 2 parity bits (one for the valid bits and one for the data bits) Only the beginning address of the block is stored because when the cache 18 retrieves data from the main memory 10, it does so in blocks. Therefore, the presence of the beginning address of the block indicates that all bytes in the block are present in the cache.

The tag RAMs 30 are controlled by a pair of cache tag managers (CTMA, CTMV) 32, 34. CTMA 32 receives all physical addresses generated by the CPU 13 and compares these received addresses to the addresses contained in the tag RAMs 30. CTMA 32 requests the addresses stored in each set of the tag RAMs 30 and compares these addresses to the CPU generated address. A match indicates that the data requested by the CPU 13 are present in the cache 18. However, even though the data are present, it is possible that they been invalidated. Accordingly, a "hit" in CTMA 32 is communicated to CTMV 34 where the valid bits contained in the tag RAMs 30 are inspected. If the data present at the address generated by the CPU 13 are valid, a signal is delivered to a series of four data traffic managers (DTM0, DTM1, DTM2, DTM3) 36, 38, 40, 42, which control all movement of data into or out of the data RAMs 26, 28. Each of the four DTMs 36 38, 40, 42 communicates a 2-byte slice of the quadword data to and from the data RAMs 26, 28.

The physical memory address generated by the CPU 13 is also delivered to a pair of physical address drivers (PAD0, PAD1) 44, 46. PAD0 and PAD1 44, 46 are respectively associated with the second and first sets of data RAMs 28, 26 and act to drive all of the address lines and write enables to the data RAMs 28, 26. Accordingly, the addresses delivered by PAD0 and PAD1 44, 46 control the routing of data between the data RAMs 26, 28 and DTM0-DTM3. For example, the CpU 13 attempts to read a specified memory location by delivering that address to CTMA 32, PAD0 44, and PAD1 46. PAD0 and PAD1 44, 46 immediately pass the address to the two sets of data RAMs 28, 26. The data located in those RAM locations is presented at the data RAM outputs. DTM0-DTM3 will accept the data from only one set of the data RAMs 26, 28 and then only if CTMV 34 indicates that there has been a hit and the data are valid.

Otherwise, CTMV initiates a data request from main memory 10 to update the data RAMs 26, 28 with the data currently desired by the CPU 13. The block address is forwarded to the main memory 10 which responds by delivering the desired block of data over data return lines 48 to DTM0-DTM3. The data return lines 48 are sixty-four bits wide allowing the 64-byte block to be transferred in eight consecutive quadwords. Each quadword is consecutively stored in the appropriate data RAM location until the entire block has been transferred from main memory 10 to the cache 18. Thereafter, the read operation is completed by the cache 18.

As discussed previously, retrieving a block of data from main memory 10 and storing it in the cache 18 displaces data previously stored in the cache 18. Further, displaced data which has been written by the CPU 13 does not have a corresponding copy in main memory 10. Therefore, to avoid losing this written data, WBB 22 is provided to temporarily store the written data until they can be written back to main memory 10. Accordingly, after DTM0-DTM3 transfers the desired block address to main memory 10, there will be a 20 to 30 machine cycle delay until the requested data are returned from the main memory 10. This delay is of sufficient length to allow the DTM0-DTM3 to read the data out of cache 18 and place the data in the WBB 22. So, when the data are returned from the main memory 10 there are no conflicts within the data RAMs 26, 28 and the newly retrieved data can be immediately written into the cache 18. The main memory read delay is advantageously used to transfer the cache data block to WBB 22 "underneath" the main memory data request, thereby avoiding any performance penalties.

WBB 22 is divided into two similar physical packages, WBEM 50 and WBES 52. The actual buffer itself is divided symmetrically between WBEM and WBES. Each contains eight lines, four bytes wide for a total buffer size of 64-bytes or one block. The difference between WBEM and WBES is the manner in which they participate in the error correction process. The error correction process is more fully described below in conjunction with FIGS. 3 and 4.

The ECC RAMs 24 includes eight 4k×4 RAMs arranged similar to the data RAMs 26, 28 The ECC RAMs 24 are 2-way set associative with each set having 8k lines, 8-bits wide and each line corresponding to a quadword line of the data RAMs 26, 28. An 8-bit check bit pattern is developed and stored in the ECC RAMs 24 as each quadword of data are stored in the data RAMs 26, 28. Subsequent writes to the data RAMs 26, 28 by the CPU 13 will similarly result in the check bit pattern being altered correspondingly.

The check bit pattern is used to detect single and double bit errors and correct those single bit errors. However, only the data being written back to the main memory 10 are compared against its check bit pattern. Since WBB 22 receives all data that is to be written back to the main memory 10, WBB 22 is a convenient location at which to compare the data to its check bit pattern and correct any errors.

Figure 3:
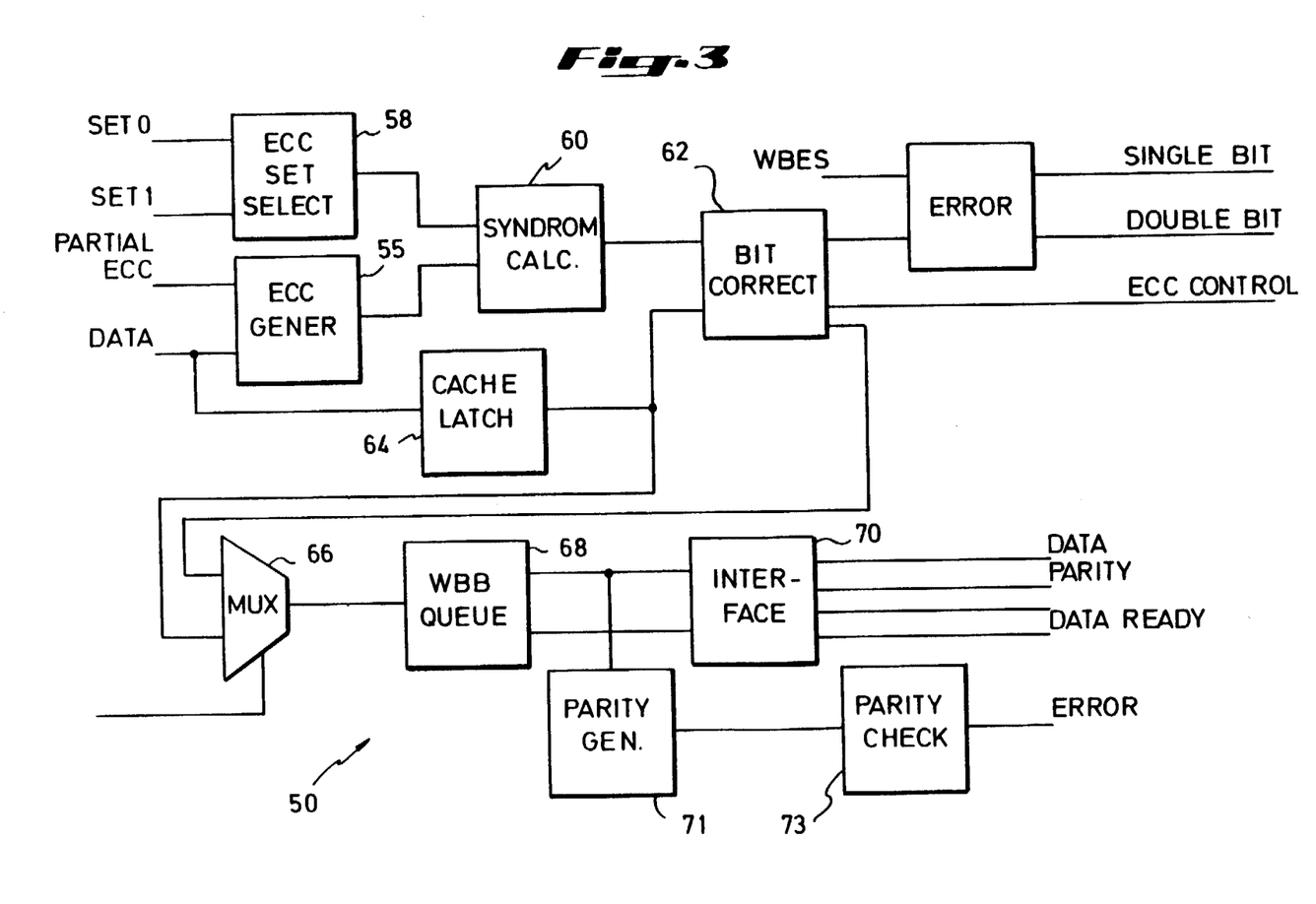
FIG. 3 is a block diagram of the first portion of the write back buffer and associated error correction code hardware.
Figure 4:
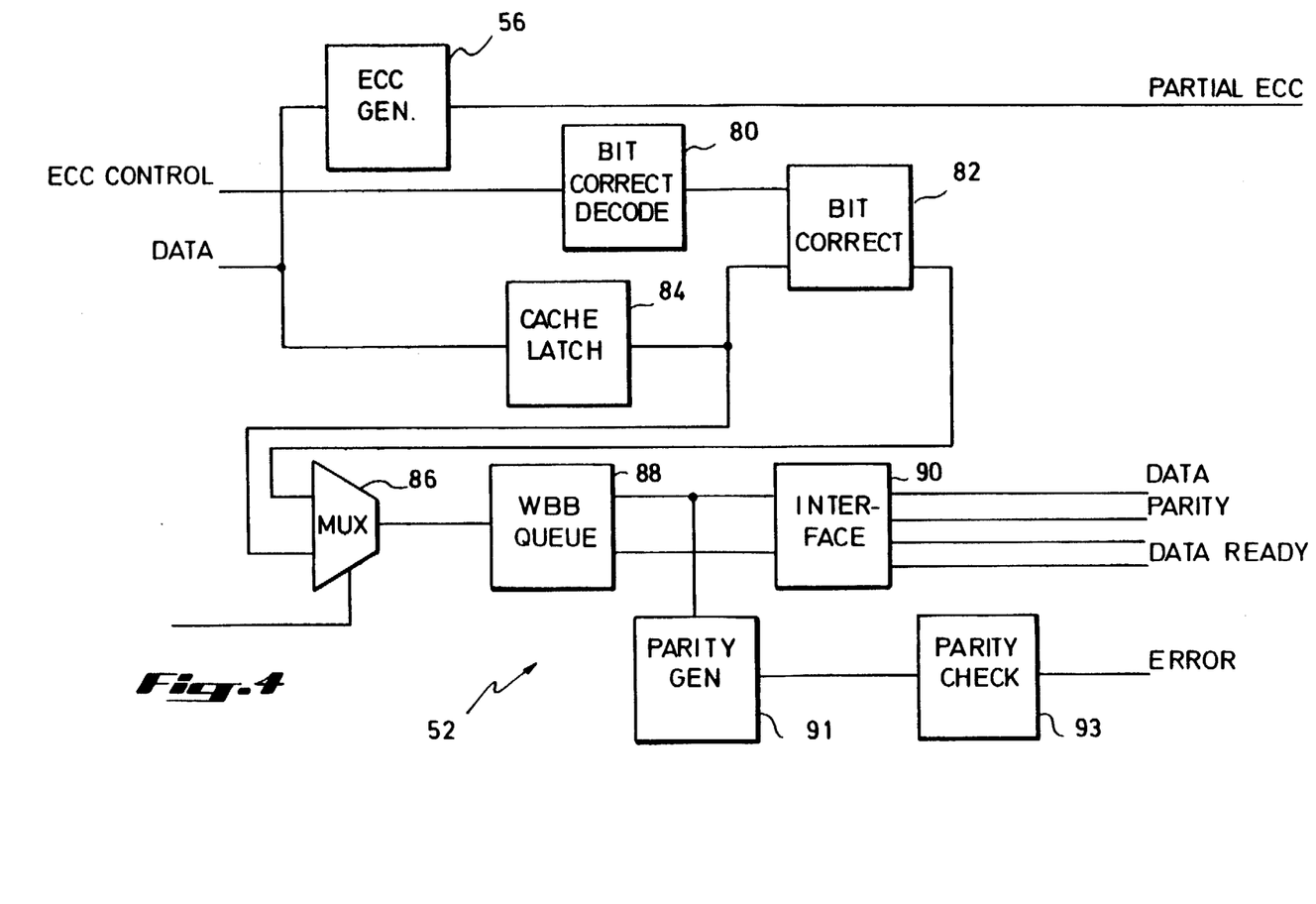
FIG. 4 is a block diagram of the second portion of the write back buffer and associated error correction code hardware.

Referring now to both FIGS. 3 and 4, detailed block diagrams of the internal structure of WBEM 50 and WBES 52 are illustrated. Data from DTM0-DTM3 is delivered directly to error code correction generators 55, 56 respectively contained within WBEM and WBES. The generators 55, 56 are substantially similar and each acts to produce an error correction code based on the slice of data it receives. For example, in the preferred embodiment data bits 0-15 and 32-47 are delivered to WBEM while data bits 16-31 and 48-63 are delivered to WBES. Each generator produces a partial error correction code which are combined to form a single complete error correction code for the quadword of data. The WBES partial error correction code is delivered to the WBEM generator where the two partial codes are combined.

Simultaneously, the error correction codes stored in the ECC RAMs (24 in FIG. 2) are delivered to ECC set select 58. Since the RAMs 24 are two-way set associative, there are two possible locations where the code is stored. Both sets are delivered to the set select 58 where, based on the address, one of the sets is selected and delivered to the syndrome calculator 60. The complete error correction code produced by the generator 55 is also delivered to the syndrome calculator 60.

The syndrome calculator 60 compares the error correction code of the data actually being sent to WBB 22 and the error correction code for the data that was stored in the data RAMs 26, 28. Clearly, the error correction codes should be identical, assuming no errors. However, in the event of an error, the syndrome calculator identifies which bits are in error and delivers that information to the bit correction hardware 62.

The data delivered to the ECC generator 55 is also maintained in a cache latch 64. The cache latch 64 provides this data to the bit correction hardware 62 where its erroneous bits are corrected. Once the faulty bit is identified, it need only be toggled to its opposite state to effect a correction. It should be remembered that only one-half of the data bits are present in WBEM. Consequently, if the error is in the remaining thirty-two bits in WBES, then the bit correction information must be communicated to WBES. Accordingly, the bit correction hardware 62 delivers a 5-bit ECC control signal to WBES.

A two-input multiplexer 66 receives the actual data from the cache latch 64 and the corrected data from the bit correction hardware 62. The select line of the multiplexer 66 is controlled to deliver the corrected data if an error is detected by the syndrome calculator 60. Otherwise, the actual data are passed through the multiplexer 66 to the WBB queue 68.

An interface 70 is positioned between the WBB queue 68 and main memory 10 and acts to coordinate the transfer of the data and an associated parity signal therebetween. To check for parity errors, the actual parity of the data is determined by a parity generator 71 and compared by a parity checker 73 to the parity signal. The ordinary sequence of events begins with the interface 70 issuing a "data ready" signal to the main memory 10. The main memory 10 receives the signal along with similar signals from the other CPUs or input/output devices, arbitrates all of the received signals, and when the data ready signal wins arbitration, the address is decoded and a "send data" signal is returned to WBB 22. WBB queue 68 responds by unloading data in eight consecutive cycles to the main memory 10.

Operation of WBES is similar, but differs in the error detection function. The syndrome calculation is performed exclusively in WBEM with the pertinent results being communicated to WBES via the 5-bit ECC control signal. A bit correction decoder 80 receives the control signal and converts the 5-bit signal into a 32-bit correction mask which is transmitted to the bit correction hardware 82. The bit correction hardware 82 also receives the actual data from a cache latch 84. Bit correction is a matter of XORing the bit correction mask with the erroneous data. This process effectively toggles the faulty bit to the opposite state. Hereafter, operation of a multiplexer 86, WBB queue 88, interface 90, parity generator 91, and parity checker 93 are identical to that of the multiplexer 66, WBB queue 68, interface 70, parity generator 71 and parity checker 73 described in conjunction with WBEM in FIG. 3

Figure 5:
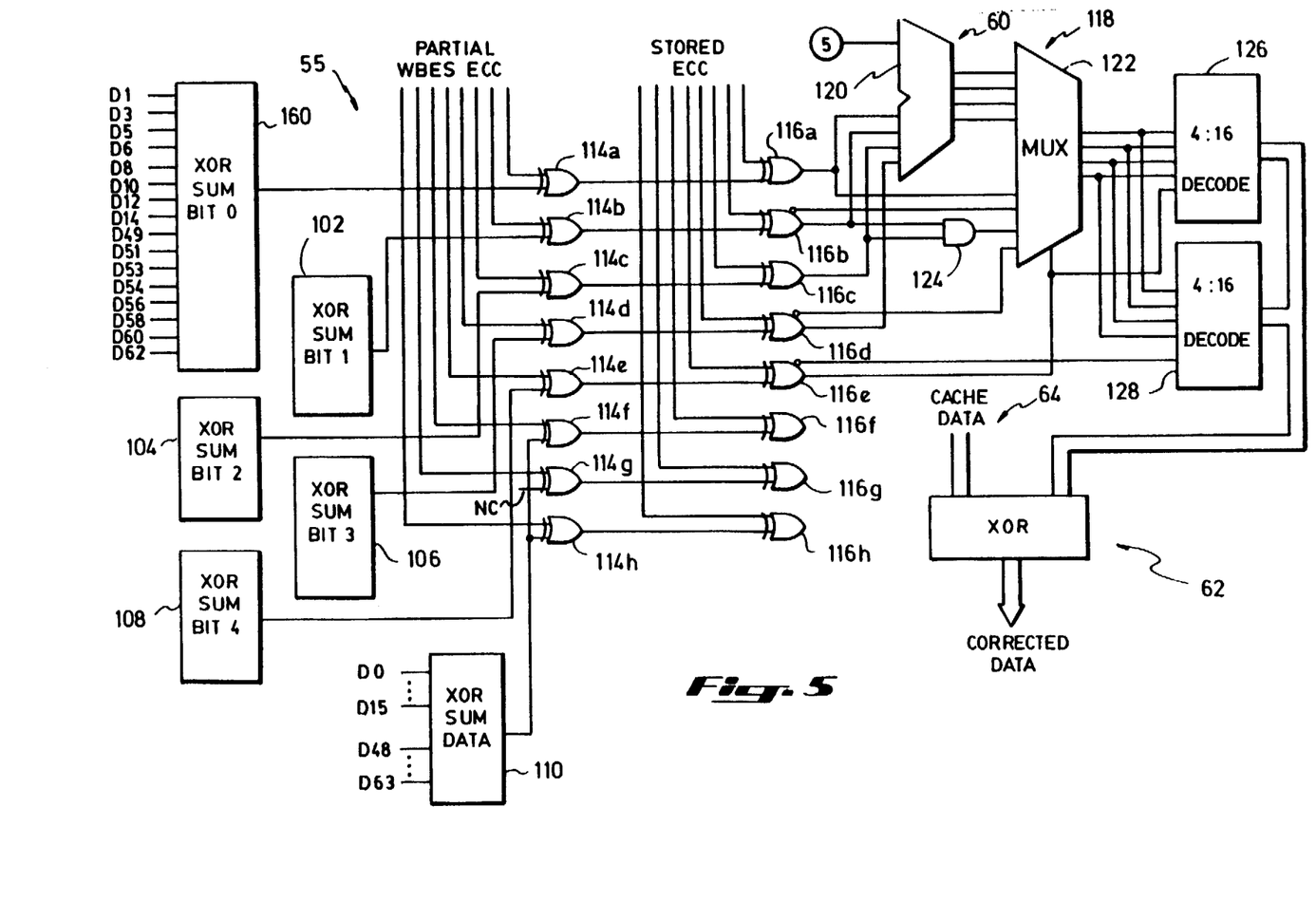
FIG. 5 is a schematic diagram of an error correction code generator, a syndrome calculator, and bit correction hardware.

Referring now to FIG. 5, a detailed schematic of the ECC generator 55, syndrome calculator 60, and bit correction hardware 62 is shown. The ECC generator 55 includes six banks of XOR gates 100, 102, 104, 106, 108, 110 with the inputs to each bank configured according to the Hamming code illustrated in TABLE I. A unique 7-bit ECC code is provided for each of the 64-bits of data. However, by carefully partitioning the data into four 16-bit slices, the lower 5-bits of the ECC code is identical for each slice of data. Only bits 5 and 6 differ between the slices. For example, it should be remembered that WBB is split into two sections which each receive one-half of the data bits. Further, in TABLE I the data bits are partitioned into four slices with two slices being delivered to each ECC generator 55, 56. In the preferred embodiment, slices 0 and 2 are delivered to the WBEM ECC generator 55, while slices 1 and 3 are delivered to the WBES ECC generator 56.

Thus, for example, to determine if the zero bit of the ECC code should be asserted, each of the zero bits in slices 0 and 3 should be XORed together. Accordingly, by inspecting the Hamming code illustrated in TABLE I it is clear that only the following data bits need be combined to generate the ECC zero bit: 1,3,5,6,8,10,12,14,49,51,53,54,56,58,60,62. Only these bits need be considered because the ECC zero bit for the remaining data bits are not asserted and will have no impact if combined in the XOR bank.

Figure 6:
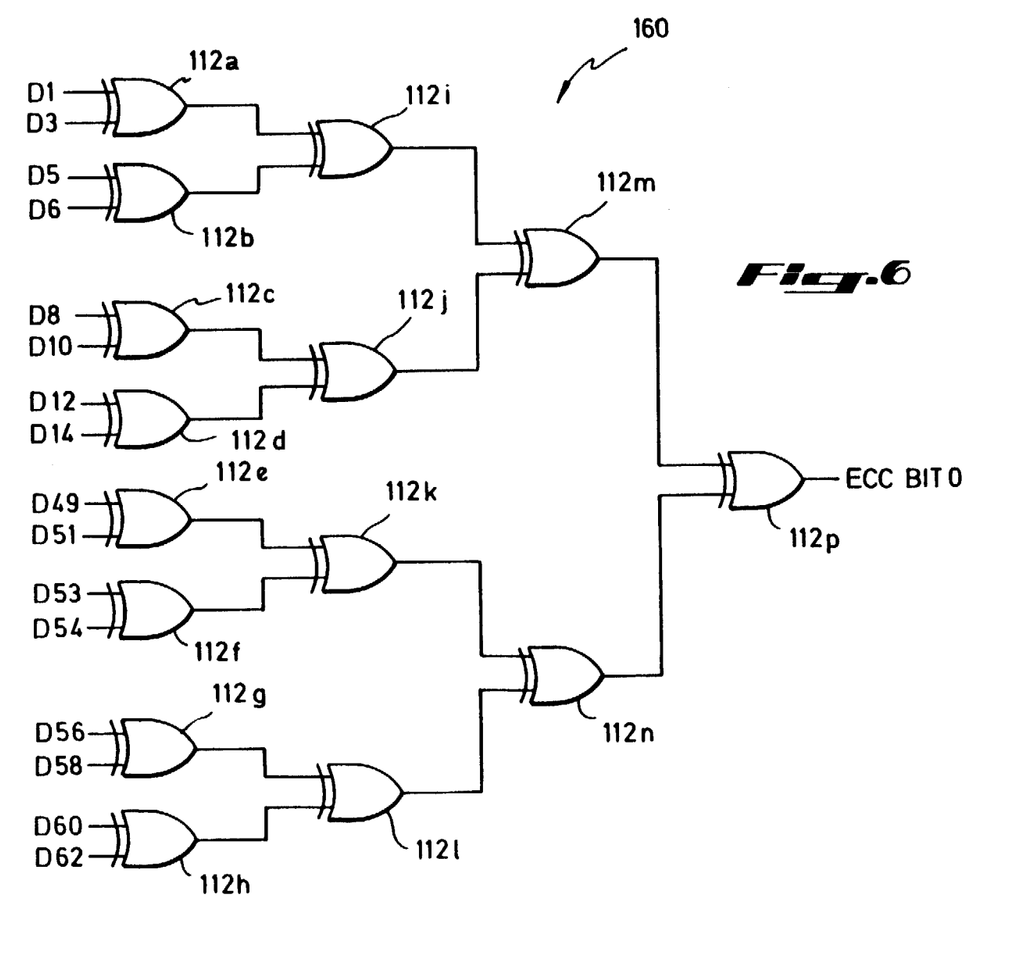
FIG. 6 is a schematic diagram of an XOR summing circuit for the error correction code generator.

The zero bit XOR combination is illustrated in FIG. 6. XOR gates 112a–112h receive those identified data bits D0 to D62 and perform the XOR function on adjacent pairs. The results of this first level of XORing are passed to a second level of XOR gates 112i–112L where the adjacent pairs of the first level results are again XORed together. The process is repeated by a third stage of XOR gates 112m–112n and the final pair is combined in XOR gate 112p. Thus, the output of XOR SUM BIT 0 is asserted if an odd number of the data bits are asserted or, conversely, not asserted if an even number of data bits are asserted.

This same process is simultaneously performed in the XOR banks 102, 104, 106, 108 to respectively arrive at ECC bits 1, 2, 3, 4. The only difference being that the data bits delivered to each bank are unique and correspond to the Hamming code identified in TABLE I. However, since only one-half of the data bits are present in WBEM, the ECC generating process is incomplete until combined with the partial ECC generated by WBES. It should be appreciated that an identical process is simultaneously performed in WBES ECC generator 56 for those data bits delivered thereto. Accordingly, another level of XOR gates 114a–114h receive the partial ECC codes generated by WBEM and WBES to produce the final ECC code.

An example serves to better illustrate the process of generating the ECC code. Assume that the quadword of data delivered to WBB is 000000000000001F (hexidecimal). Thus, individual bits 0, 1, 2, 3, and 4 are asserted. Since the asserted bits are all contained in slice 0 of TABLE I, only the WBEM ECC generator 55 is affected (the output of each XOR bank in the WBES ECC generator is not asserted). The output of XOR bank 100 is similarly not asserted because an even number of asserted bits are XORed together (bits 1 and 3). However, the outputs of XOR banks 102, 104, and 105 are asserted respectively because bits 0, 1, and 4 are XORed together, bits 2, 3, and 4 are XORed together, and bits 0, 1, 2, 3, and 4 are XORed together. However, ECC bit 4 (XOR bank 108) is not asserted since none of the bits 0–4 are combined to arrive at ECC bit 4. Further, as noted previously, none of the WBES ECC bits are asserted. Accordingly, the XOR gates 114a–114e have no affect and simply pass the WBEM ECC code. Therefore, in this example the ECC code is 01110 (binary).

The final ECC code is delivered to the syndrome calculator 60 which determines if an error exists, and if so, which bit is erroneous. In order to first determine if an error exists, the ECC code which was previously stored in the ECC RAMs 24 is compared to the ECC code produced by the ECC generator 55. Any differences between the two ECC codes indicates an error exists. To compare the ECC codes the corresponding bits of each code are XORed together in a bank of XOR gates 116a–116g. If the codes are identical, the output of each of the XOR gates 116a–116g will not be asserted. Conversely, any differences result in the two inputs to one of the XOR gates 116a–116g being different and producing an asserted signal.

A logic circuit 118 interprets the lower four bits of the compared ECC codes in order to determine which of the data bits is in error. It should be apparent that in a binary system an erroneous data bit simply means that the bit need only be changed from its present value to the only other possible value in order to correct it. Therefore, correcting the cache data are effected by generating a mask which is all zeros except the bit which is in error. By XORing the mask with the data, the erroneous bit is toggled to its opposite state. For example, if bit five in a thirty-two bit word is in error, the binary mask would be:

00000000000000000000000000100000

Thus, if each of these 32 bits is XORed with the 32-bit data word, the data word will be passed unaltered except for bit five which would be flipped to its opposite state. The bit correction hardware 62 performs precisely this function.

The logic circuit 118 which generates this 32-bit mask includes a 4-bit adder 120 which has one input connected to the constant five and its second input connected to the outputs of XOR gates 116a–116d. The output of the adder 120 is connected to a multiplexer 122. The second input to the multiplexer 122 is connected to a logical combination of the outputs of XOR gates 116a–116d. The output of gate 116a is connected to bit 0 of the multiplexer second input. The inverted output of gate 116b is connected to bit one of the multiplexer second input. An AND gate 124 receives its inputs from the outputs of gates 116b and 116c and delivers its output to bit three of the multiplexer second input. Bit four of the multiplexer second input is connected to the inverted output of the gate 116d. Finally the output of XOR gate 116e controls the select function of the multiplexer 122. Therefore, depending upon the value of the difference in ECC codes, two different conversion routines are employed. If bit four of the ECC codes differ, then the second input of the multiplexer 122 is selected.

A pair of 4:16 decoders 126, 128 each receive the 4-bit output signal from the multiplexer 122 and controllably decode the 4-bit signal into its 16-bit counterpart. The inverted and noninverted outputs of XOR gate 116d respectively control the enable inputs of the decoders 126, 128. Thus, operation of the decoders 126, 128 is mutually exclusive. Decoder 126 provides the lower 16-bits of the 32-bit mask, while decoder 128 provides the upper 16-bits. Therefore, a data bit error in slice 0 causes the multiplexer 122 to select the output of the adder 120. Decoder 126 is similarly selected by the output of XOR gate 116d to convert the 4-bit code into the lower 16-bit portion of the mask. Since decoder 128 is not enabled, its output remains unasserted. Conversely, a data bit error in slice 3 causes XOR gate 116d to pass the second input to the multiplexer 122 to the decoder 128. Decoder 128 provides the upper 16-bit error correction mask while decoder 126 delivers lower unasserted 16-bits.

Figure 7:
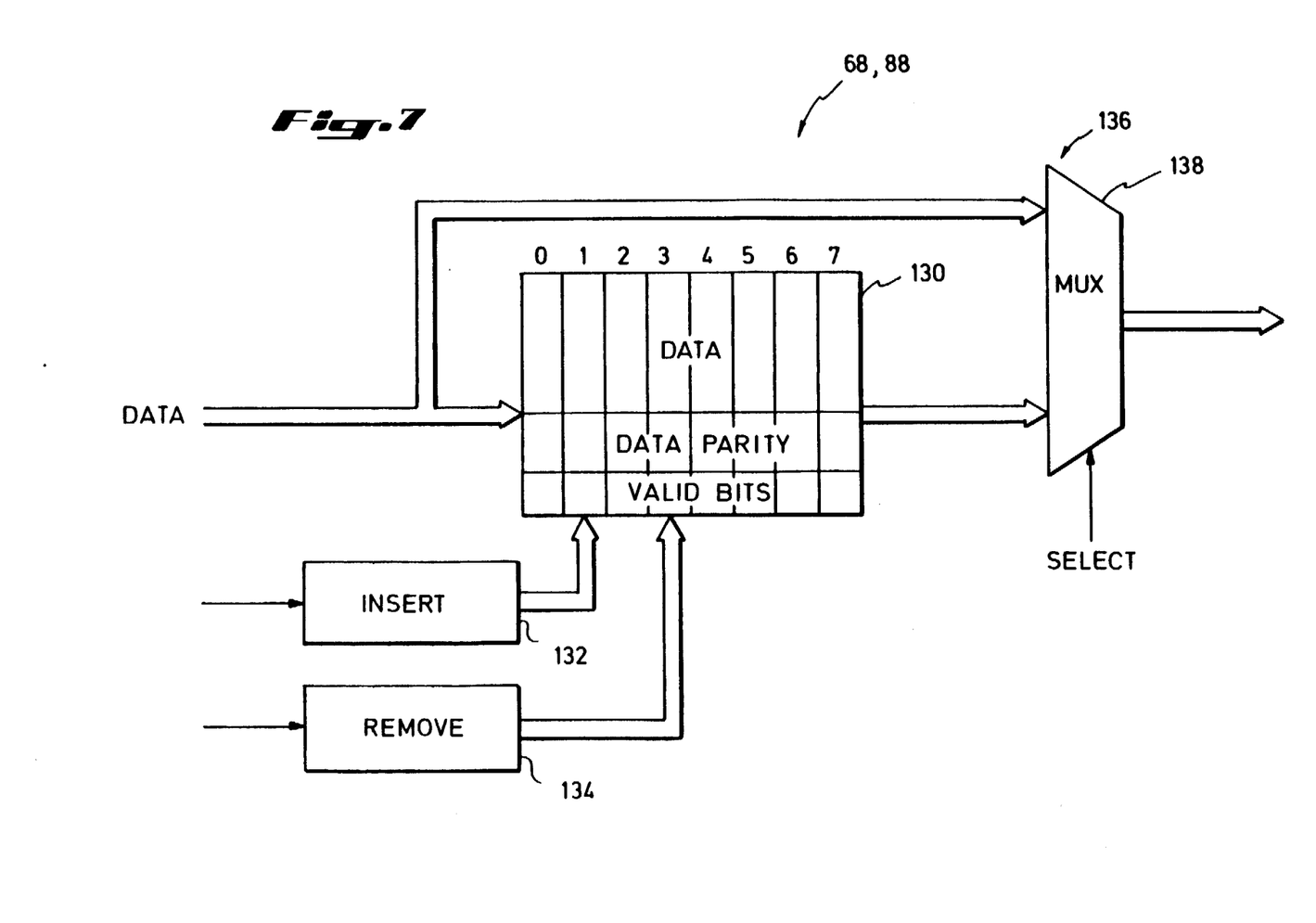
FIG. 7 a schematic diagram of a write buffer queue circuit that is used in both of the write buffer portions shown in FIG. 3 and FIG. 4.

Referring now to FIG. 7, a block diagram of the WBB queues 68, 88 is illustrated. Data transfers between main memory 10 and the memory access unit 12 are generally performed in 64-byte blocks. Thus, the WBB queues 68, 88 include a series of eight 8-byte registers 130 for temporarily storing the data. In addition to the data, WBB queue also receives data parity and valid bits associated with each 8-byte register. Insert and remove pointers 132, 134 are provided to control loading and unloading of the registers 130. The data transfers occur in eight consecutive clock cycles. Thus, during loading of the registers 130, the insert pointer 132 is incremented once at each clock cycle transition. Similarly, during unloading the remove pointer 134 is incremented once at each clock cycle transition.

Under certain operating conditions it would be possible to stall the operation of the write back. For example, the CPU 13 generates a memory request which misses in the cache 18. Thus, the memory access unit 12 initiates a main memory fetch and checks the dirty bit for the targeted cache location. An asserted dirty bit results in the data being transferred from the cache 18 to the WBB queue 130 while the main memory fetch is being processed. At this point, if another CPU requests data which is only found in the present cache 18, then main memory 10 will request that the memory access unit 12 deliver such data via the WBB queue. Further, main memory 10 will not complete the memory fetch until it receives the requested write back data from the cache 18. WBB queue presently contains the only copy of that data which was written back. Therefore, it cannot simply dump that data to process the main memory data request. Accordingly, a WBB queue bypass 136 is provided. The bypass includes a multiplexer 138 which receives inputs from both the WBB queue 68 and the actual data input to the WBB queue 68. Toggling the select input to the multiplexer allows the WBB queue 68 to be bypassed under these specific conditions. After the main memory data request is completed, the multiplexer select line is returned to its former value so that the initial write back operation is completed.

TABLE I

| Data Bit (dec) | ECC Bit Code | |
|---|---|---|
| | (dec) | (binary) 65 43210 |
| Slice 0 | | |
| 00 | 10 | 00 01010 |
| 01 | 11 | 00 01011 |
| 02 | 12 | 00 01100 |
| 03 | 13 | 00 01101 |
| 04 | 14 | 00 01110 |
| 05 | 15 | 00 01111 |
| 06 | 17 | 00 10001 |
| 07 | 18 | 00 10010 |
| 08 | 19 | 00 10011 |
| 09 | 20 | 00 10100 |
| 10 | 21 | 00 10101 |
| 11 | 22 | 00 10110 |

TABLE I-continued

| Data Bit (dec) | ECC Bit Code (dec) | (binary) 65 43210 |
|---|---|---|
| 12 | 23 | 00 10111 |
| 13 | 24 | 00 11000 |
| 14 | 25 | 00 11001 |
| 15 | 26 | 00 11010 |
| Slice 1 | | |
| 16 | 42 | 01 01010 |
| 17 | 43 | 01 01011 |
| 18 | 44 | 01 01100 |
| 19 | 45 | 01 01101 |
| 20 | 46 | 01 01110 |
| 21 | 47 | 01 01111 |
| 22 | 49 | 01 10001 |
| 23 | 50 | 01 10010 |
| 24 | 51 | 01 10011 |
| 25 | 52 | 01 10100 |
| 26 | 53 | 01 10101 |
| 27 | 54 | 01 10110 |
| 28 | 55 | 01 10111 |
| 29 | 56 | 01 11000 |
| 30 | 57 | 01 11001 |
| 31 | 58 | 01 11010 |
| Slice 2 | | |
| 32 | 74 | 10 01010 |
| 33 | 75 | 10 01011 |
| 34 | 76 | 10 01100 |
| 35 | 77 | 10 01101 |
| 36 | 78 | 10 01110 |
| 37 | 79 | 10 01111 |
| 38 | 81 | 10 10001 |
| 39 | 82 | 10 10010 |
| 40 | 83 | 10 10011 |
| 41 | 84 | 10 10100 |
| 42 | 85 | 10 10101 |
| 43 | 86 | 10 10110 |
| 44 | 87 | 10 10111 |
| 45 | 88 | 10 11000 |
| 46 | 89 | 10 11001 |
| 47 | 90 | 10 11010 |
| Slice 3 | | |
| 48 | 106 | 11 01010 |
| 49 | 107 | 11 01011 |
| 50 | 108 | 11 01100 |
| 51 | 109 | 11 01101 |
| 52 | 110 | 11 01110 |
| 53 | 111 | 11 01111 |
| 54 | 113 | 11 10001 |
| 55 | 114 | 11 10010 |
| 56 | 115 | 11 10011 |
| 57 | 116 | 11 10100 |
| 58 | 117 | 11 10101 |
| 59 | 118 | 11 10110 |
| 60 | 119 | 11 10111 |
| 61 | 120 | 11 11000 |
| 62 | 121 | 11 11001 |
| 63 | 122 | 11 11010 |

We claim:

1. A digital computer system having an apparatus for controlling write back operations between a cache memory located in a central processing unit and a main memory, comprising:

means for detecting the absence of desired data in the cache and delivering a refill request signal to the main memory, said main memory including means for processing said refill request signal during a predetermined duration of time and delivering said desired data to said cache;

a write back buffer for temporarily holding data from said cache;

means for delivering preexisting data from a location in the cache to said write back buffer during said predetermined duration of time;

means for receiving said desired data from the main memory and storing said desired data in said location in the cache;

means for delivering said preexisting data from the write back buffer to the main memory in response to delivery of said desired data to the cache being completed; and means for correcting errors in said preexisting data having been delivered from said location in said cache before said preexisting data are received by said main memory.

2. The digital computer system as set forth in claim 1, wherein said means for correcting errors includes means for determining an error correction code for said preexisting data being delivered to said write back buffer.

3. The digital computer system as set forth in claim 2, wherein said means for determining the error correction code performs said determining during said predetermined duration of time.

4. The digital computer system as set forth in claim 3, including means for determining an error correction code for said data located in said cache.

5. The digital computer system as set forth in claim 4, wherein said means for determining the error correction code for said data located in said cache performs said determining prior to said predetermined duration of time.

6. The digital computer system as set forth in claim 5, wherein said means for correcting errors further includes means for comparing the error correction codes determined prior to and during the predetermined duration of time and delivering a unique error signal having a magnitude responsive to the difference therebetween.

7. The digital computer system as set forth in claim 6, wherein said means for correcting errors further includes means for receiving said error signal, converting said error signal to a correction mask, combining said correction mask with the data delivered to said write back buffer, and storing the combined signals in the write back buffer.

8. The digital computer system as set forth in claim 7, wherein the means for combining includes means for exclusively ORing the correction mask with the data delivered to said write back buffer.

9. The digital computer system having an apparatus for controlling write back operations between a main memory and a cache memory for a central processing unit, said main memory including means responsive to a fill request for delivering specified data from said memory to the cache, said apparatus comprising:

a write back buffer for temporarily holding data from said cache;

means responsive to said fill request for transferring preexisting data from a location in said cache to said write back buffer;

means for receiving said specified data from the main memory and storing said specified data in said location in said cache to replace said preexisting data having been transferred to said write back buffer;

means for transferring said preexisting data from said write back buffer to said main memory; and means for correcting errors in said preexisting data having been transferred from said location in said cache before said preexisting data are received by said main memory.

10. The apparatus as claimed in claim 9, wherein said means for correcting errors in connected to receive said preexisting data from said location in said cache and transmit the corrected preexisting data to said write back buffer.

11. The apparatus as claimed in claim 9, wherein said means for correcting errors includes means for generating error correction code check bit patterns for data transferred from said main memory to said cache, a check bit memory for storing said check bit patterns, and means for reading said check bit patterns from said check bit memory and using the check bit patterns read from the check bit memory to correct the preexisting data transferred from said cache memory.

12. A method of data transfer in a digital computer system having a main memory and a cache memory for a central processing unit, said main memory including means responsive to a fill request for delivering specified data from said memory to said cache, said method of data transfer being responsive to said fill request and comprising the steps of:

transferring preexisting data from a location in said cache to a write back buffer and storing the preexisting data in said write back buffer;

receiving said specified data from the main memory and storing said specified data in said location in said cache to replace said preexisting data having been transferred to said write back buffer;

transferring said preexisting data from said write back buffer to said main memory; and correcting errors in said preexisting data having been transferred from said location in said cache before said preexisting data are received by said main memory.

13. The method as claimed in claim 12, wherein said errors are corrected during said step of transferring said preexisting data from said location in said cache to said write back buffer.

14. The method as claimed in claim 12, wherein said errors in the preexisting data are corrected by reading check bit patterns from a check bit memory, and using said check bit patters to correct said preexisting data.

15. The method as claimed in claim 14, wherein said check bit patterns are generated from said data transferred from said main memory to said cache.

16. The method as claimed in claim 15, wherein said check bit patterns are written into said check bit memory when said data from said memory is written into said cache.

17. The method as claimed in claim 12, wherein said preexisting data are transferred from said write back buffer to said main memory in response to completion of the transfer to data from said main memory to said cache.

* * * * *